ELECTROSTATIC PROTECTION DEVICE

Filed March 27, 1968

INVENTORS
RALPH E. NEUBER &
CYRIL DROPPA
BY
[signature]
ATTORNEY 3,509,470

ELECTROSTATIC PROTECTION DEVICE

Cyril Droppa and Ralph E. Neuber, Emporium, Pa., assignors to Sylvania Electric Products Inc., a corporation of Delaware Filed Mar. 27, 1968, Ser. No. 716,610
Int. Cl. H02h 7/20
U.S. Cl. 328—8 6 Claims

ABSTRACT OF THE DISCLOSURE

A high voltage protection device for electrical apparatus having a high voltage source and a cathode ray tube with a high voltage electrode includes a first and second spaced electrically conductive electrodes coupled to the high voltage source and high voltage electrode and to a voltage reference level respectively and electrostatically charge responsive to increased high voltage for movement toward one another to cause interruption of the application of a high voltage potential to the high voltage electrode of the cathode ray tube.

BACKGROUND OF THE INVENTION

In apparatus employing relatively high voltages, it has been found that an increase in the high voltage tends to cause undesired transmission of X-rays in some instances. Specifically, one well known type of apparatus which has received a great deal of adverse publicity because of what is believed to be an excessive transmission of X-rays is the color television receiver.

In color television receivers, it has been found that failure of some components, the shunt regulator tube of the high voltage supply for instance, causes an undesired increase in high voltage which is accompanied by an equally undesired increase in X-ray radiation. As a result, many of the recent color television receivers include circuitry which automatically disables the receiver when the high voltage undesirably increases. Thus, the viewer is immediately informed that a problem exists whereupon remedial action may be taken.

However, in many forms of apparatus employing high voltage potentials and in many of the older television models, there has not been provided the necessary circuitry for disabling the apparatus in the event of an undesired increase in high voltage and an undesired increase in X-ray radiation. Moreover, much of this older apparatus does not include any means whereby a viewer or operator of the apparatus is aware of an undesired increase in high voltage potential and X-ray radiation.

OBJECTS AND SUMMARY OF THE INVENTION

Therefore, it is an object of the present invention to provide a high voltage protection device for electrical apparatus employing a cathode ray tube type display device. Another object of the invention is to provide an electrostatic responsive high voltage protection device for electrical apparatus. Still another object of the invention is to provide a high voltage protection device for disabling electrical apparatus when the high voltage potentials employed therein undesirably increase. A further object of the invention is to provide a high voltage protective device which disables electrical apparatus upon undesired increased high voltage and which automatically returns to the original condition upon interruption of the application of the high voltage to the cathode ray tube.

These and other objects and advantages are achieved in one aspect of the invention by a high voltage protection device which includes first and second spaced electrode means coupled to a high voltage source and high voltage electrode of a cathode ray tube and to a voltage reference level respectively. The spaced first and second electrode means are electrostatically charge responsive to increased high voltage for movement toward one another to cause interruption of the application of high voltage potential to the high voltage electrode of a cathode ray tube.

DESCRIPTION OF THE PREFEERED EMBODIMENT

Figure 1:
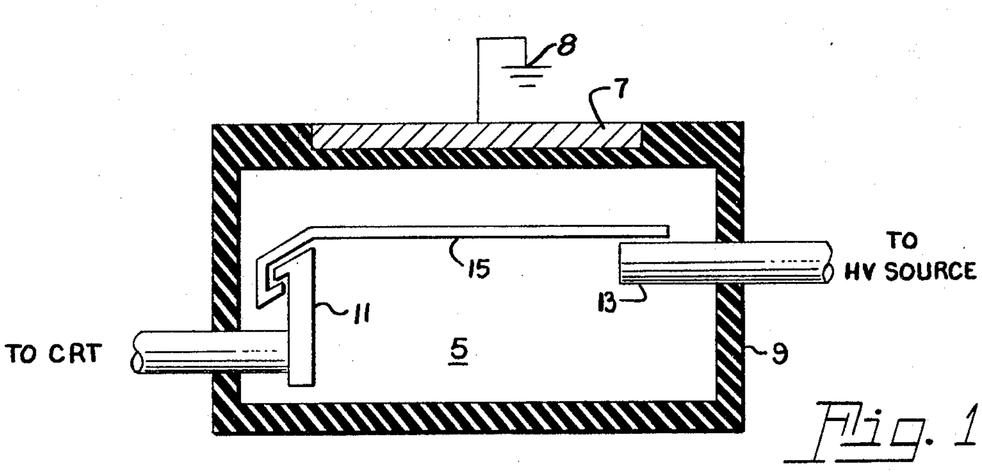
FIG. 1 is an elevational illustration of one embodiment of a high voltage protection device of the invention.

Referring to the drawings, FIG. 1 illustrates one embodiment of a high voltage protection device suitable for use in electrical apparatus employing a high voltage source and a cathode ray tube having a high voltage electrode. The protective device includes a first electrically conductive electrode means 5, a second electrically conductive electrode means 7, and an envelope 9 of electrical insulating material.

The first electrically conductive electrode means 5 includes a first and second electrical connector member 11 and 13 extending through the envelope 9, and a foil member 15. The foil member 15 is pivotally coupled to the first connector member 11 and in gravitational contacting relationship to the second connector member 13 within the envelope 9. Also, the foil member 15 is spaced from the second electrically conductive electrode means 7 which is affixed to the external surface of the envelope 9.

In operation, the first connector member 11 is coupled to the high voltage electrode of a cathode ray tube while the second connector member 13 is coupled to a high voltage source. The second electrically conductive electrode means 7 is connected to a voltage reference level 8 such as circuit ground. Thus, the foil member 15 is disposed in electrostatic charge responsive relationship to the second electrode means 7.

Upon increase in the potential difference between the second electrode means 7 and the foil member 15, as by an undesired increase in the potential of the high voltage source for instance, the electrostatic attraction between the second electrode means 7 and the foil member 15 increases causing the foil member 15 to pivot on the first connector member 11 and move toward the second electrode means 7 breaking the electrical connection of the first connector member 11 to the second connector member 13. Thus, the application of a high voltage potential to the high voltage electrode of the cathode ray tube is interrupted when the foil member 15 pivots and the cathode ray tube disabled.

It should be noted that the pivoted action of the foil member 15 in conjunction with a gravitational force acting thereon provides repetitive enablement and disablement of the cathode ray tube whereby the viewer or operator is aware of a problem requiring repair. Moreover, reversal of the connections to the first and second connector members 11 and 13 respectively to the high voltage source and high voltage electrode will result in disablement of the cathode ray tube when the high voltage potential increases. This cathode ray tube disablement will remain until the cause for the increase in potential from the high voltage source has been determined and repaired.

Figure 2:
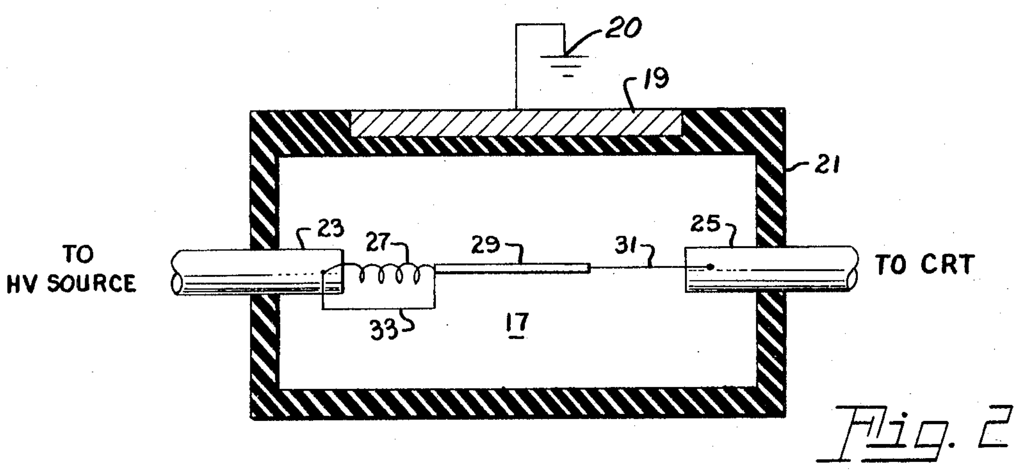
FIG. 2 is an alternative embodiment of a high voltage protection device.

FIG. 2 illustrates an alternative embodiment of a high voltage protection device. Herein, the protection device includes a first electrically conductive electrode means 17, a second electrically conductive electrode means 19, and an envelope 21 of electrical insulating material such as glass for example.

The first electrode means 17 includes a first and second electrical connectors 23 and 25 extending through the envelope 21 and a spring member 27, foil member 29, and an integral rubber and metal particle structure 31 series connected intermediate th first and second electrical connectors 23 and 25. A spring limiting means 33, such as a wire for instance, shunts the spring member 27 and the first electrode means 17 is disposed in spaced relationship to a second electrode means 19 affixed to the envelope 21.

In operation, the first electrical connector 23 of the first electrode means 17 is coupled to the high voltage electrode of a cathode ray tube while the second electrical connector 25 is coupled to a high voltage source. Also, the second electrode means 19 is coupled to a voltage reference level 20 such as circuit ground.

Upon increase in the potential available from the high voltage source, the electrostatic attraction between the second electrode means 19 and the foil member 29 of the first electrode means 17 increases causing movement of the foil member 29 toward the second electrode means 19. Thereupon, the spring member 27 and rubber and metal particle structure 31 are stretched eliminating or at least greatly reducing conduction through the rubber and metal particle structure 31.

As a result, the elimination or at least greatly reduced conduction through the rubber and metal particle structure 31 causes an interruption in potential applied to the cathode ray tube. Thus, the cathode ray tube display device is disabled whereupon an operator or viewer is alerted to a problem. Also, it should be noted that the high voltage protection device automatically returns to a normal or operational condition upon elimination of the undesired increase in high voltage potential.

Figure 3:
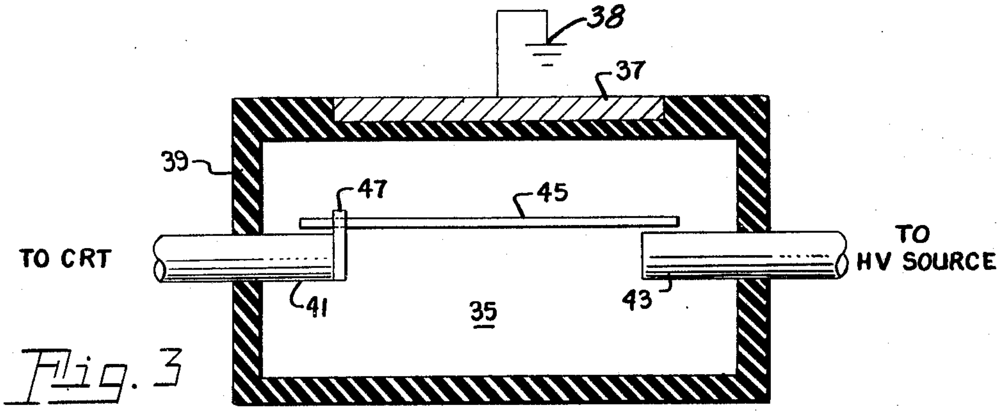
FIG. 3 is another embodiment of a high voltage protection device.

In still another embodiment, FIG. 3 illustrates a high voltage protective device having a first electrically conductive electrode means 35, a second electrically conductive electrode means 37, and an envelope 39 of dielectric material. The first electrode means 35 includes a first and second electrical connector 41 and 43 extending through the envelope 39 and a foil member 45 interconnecting the first and second electrical connectors 41 and 43 and spaced from the second electrode means 37 coupled to a potential reference level 38.

Also, the first connector 41 includes an upstanding portion 47 which extends through an aperture 49 in the foil member 45. Moreover, the foil member 45 is in overlapping gravitational relationship to the second electrical connector 43 and the upstanding portion 47 tends to guide and direct the movement of the foil member 45.

The operation is essentially as described with respect to FIGS. 1 and 2. Specifically, an increase in potential difference between the first and second electrically conductive electrode means 35 and 37 respectively causes an attractive force and movement of the foil member 45 toward the second electrode means 37. Thereupon, application of a high voltage potential from the high voltage source to the high voltage electrode of the cathode ray tube is interrupted, and a viewer or operator is alerted to a problem. Moreover, the foil member 45 automatically returns to the normal operational condition when the potential difference between the first and second electrode means 35 and 37 is returned to a normal condition.

Thus, there has been provided a high voltage protection device for electrical apparatus employing a high voltage source and a cathode ray tube with a high voltage electrode. The device is electrostatically charge responsive to an increase in potential applied to the high voltage electrode of the cathode ray tube to cause an interruption of the high voltage application whereby the electrical apparatus is disabled and a viewer or observer becomes immediately aware of an existent problem. Moreover, the device automatically returns to an original operational condition when the applied high voltage is returned to an original desired value.

While there has been shown and described what is at present considered the preferred embodiments of the invention, it will be obvious to those skilled in the art that various changes and modifications may be made therein without departing from the invention as defined by the appended claims.

1. A high voltage protection device for cathode ray tube systems comprising in combination:

a cathode ray tube having a high voltage electrode;

a high voltage source;

first electrically conductive electrode means including an electrostatic charge responsive portion coupling said high voltage source to said high voltage electrode of said cathode ray tube;

a potential reference level; and second electrically conductive electrode means coupled to said potential reference level and spaced from said first electrically conductive electrode means, said electrostatic charge resposive portion of said first electrically conductive electrode means and said second electrically conductive electrode means being formed for relative movement toward each other causing discontinuance of said coupling of said high voltage source to said high voltage electrode of said cathode ray tube upon increase in potential difference therebetween and automatic movement away from each other causing coupling of said high voltage source to said high voltage electrode of said cathode ray tube upon discontinuance of said increase in potential difference therebetween.

2. The combination of claim 1 including an envelope of electrical insulating material supporting said first and second electrically conductive electrode means in spaced relationship to each other.

3. The combination of claim 1 wherein said electrostatically charge responsive portion of said first electrically conductive electrode means includes a pivotable metal foil member whereby increased potential difference intermediate said first and second electrically conductive electrode means causes electrostatic charge responsive movement of said metal foil member to effect interruption of the application of potential from said high volage source to said high voltage electrode of said cathode ray tube.

4. The combination of claim 1 wherein said electrostatically charge responsive portion of said first electrically conductive electrode means includes a spring member, a metal foil member, and an integral rubber and metal particle member series connected intermediate said high voltage source and said high voltage electrode of said first electrically conductive electrode means whereby increased potential difference intermediate said first and second electrically conductive electrode means causes electrostatic charge responsive movement of said metal foil member causing movement of said integral rubber and metal particle member to effect interruption in the application of potential to said high voltage electrode of said cathode ray tube from said high voltage source.

5. The combination of claim 1 wherein said electrostatically charge responsive portion of said first electrically conductive electrode means is flexibly supported at one end thereof and spaced from said second electrically conductive electrode means whereby increased potential difference intermediate said first and second electrically conductive electrode means causes movement of said flexibly supported electrostatically charge responsive portion to effect interrption in the application of potential to said high voltage electrode of said cathode ray tube from said high voltage source.

6. The combination of claim 2 wherein at least one of said first and second electrically conductive electrode means is disposed within said envelope of electrical insulating material.

References Cited

UNITED STATES PATENTS

| | | | |
|---|---|---|---|
| 1,671,205 | 5/1928 | Oswald | 328—8 |
| 2,927,255 | 3/1960 | Diesel | 317—144 |
| 3,292,111 | 12/1966 | Cotton | 200—181 |

JOHN W. HUCKERT, Primary Examiner

S. BRODER, Assistant Examiner

U.S. Cl. X.R.

200—181; 315—307